(12) United States Patent
Knepper

(10) Patent No.: US 6,562,931 B1
(45) Date of Patent: May 13, 2003

(54) ROOM TEMPERATURE VULCANIZABLE SILICONE COMPOSITIONS WITH IMPROVED ADHESION TO ACRYLIC

(75) Inventor: Jeffrey A. Knepper, Branchburg, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/698,974

(22) Filed: Oct. 27, 2000

Related U.S. Application Data
(60) Provisional application No. 60/162,555, filed on Oct. 29, 1999.

(51) Int. Cl.[7] ............................................. C08G 77/08
(52) U.S. Cl. ....................... 528/17; 525/477; 528/34; 528/43; 528/38; 528/18; 528/901; 524/492
(58) Field of Search ............................ 525/477; 528/34, 528/43, 38, 17, 18, 901; 524/492

(56) References Cited

U.S. PATENT DOCUMENTS 3,609,178 A    9/1971    Thomas
4,797,439 A    1/1989    Peccoux
4,996,112 A    2/1991    Pierron et al.

FOREIGN PATENT DOCUMENTS

| EP | 102268 | * | 3/1984 |
| EP | 0 499 747 A | | 8/1992 |
| EP | 0 565 318 A | | 10/1993 |
| WO | 95 32245 A | | 11/1995 |

OTHER PUBLICATIONS

Patent Abstracts of Japan, vol. 1999, No. 13, Nov. 30, 1999 & JP 11 209620 A (Shin Etsu Chem Co Ltd), Aug. 3, 1999 abstract.

* cited by examiner

*Primary Examiner*—Robert Dawson
*Assistant Examiner*—Kuo-Liang Peng
(74) *Attorney, Agent, or Firm*—Scott D. Jacobson

(57) ABSTRACT

Room temperature vulcanizable silicone rubber compositions comprising: hydroxyl endblocked polyorganosiloxane, at least one phenyl-substituted tris-functional ketoximino silane and an aminofunctional silane adhesion promoter characterized as having less than three hydrolyzable alkoxy groups attached to the silicon are provided.

15 Claims, No Drawings

ROOM TEMPERATURE VULCANIZABLE SILICONE COMPOSITIONS WITH IMPROVED ADHESION TO ACRYLIC

CROSS-REFERENCE TO RELATED APPLICATION

This application claims benefit of U.S. Provisional Application Ser. No. 60/162,555 filed Oct. 29, 1999.

FIELD OF THE INVENTION

The present invention relates to one component silicone compositions which cure at room temperature to form elastomeric type products. More particularly the present invention relates to room temperature vulcanizable. (RTV) silicone rubber compositions with improved adhesion to acrylic substrates.

SUMMARY OF THE INVENTION

The composition of the present invention is a one component RTV silicone composition comprising: (A) hydroxyl endblocked polyorganosiloxane, (B) at least one phenyl substituted tris-functional ketoximino silane and (C) an aminofunctional silane adhesion promoter which is characterized as having less than three hydrolyzable alkoxy groups attached to silicon or Si.

The sealant composition of the present invention contains (A) hydroxyl endblocked diorganosiloxane as a basic ingredient which may have a viscosity generally between about 100 to about 500,000 centipoise at 25° C., preferably from about 2000 to about 350,000 centipoise, and most preferably between about 2000 and about 150,000 centipoise. These diorganosiloxane polymers are well-known in the art. The polymer may have the following general formula:

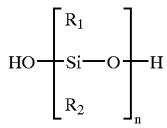

where n varies such that the viscosity of the polymer varies from 100 to 500,000 centipoise. The organo groups can be monovalent hydrocarbon radicals or monovalent halogenated carbon radicals. Examples of such monovalent hydrocarbon radicals are methyl, ethyl, propyl, butyl, phenyl, methylphenyl, ethylphenyl, vinyl, allyl, cyclohexyl, tolyl, and isopropyl. Examples of monovalent halogenated hydrocarbon radicals are chloropropyl, 3,3,3-trifluoropropyl, chlorophenyl, beta- (perfluorobutyl)ethyl, and chlorocyclohexyl. Preferably the organic radicals are methyl, ethyl, phenyl, vinyl, and 3,3,3-trifluoropropyl. The polydiorganosiloxane can have in addition to the diorganosiloxane units, mono-organosilsesquioxane units, triorganosiloxy units, and SiO2 units. Polydiorganosiloxanes which have both hydroxyl endblocking and triorganosiloxy endblocking may also be used and are described in U.S. Pat. No. 3,274,145 by Dupree, which is incorporated herein by reference. Component (A) can be a mixture of two or more polyorganodisiloxanes as long as the average viscosity of the mixture falls within the viscosities stated above. The preferred hydroxy terminated polydiorganosiloxane polymer has methyl as the organic substituent on the polymer backbone and is available from a number of sources such as General Electric, blacker Silicones, Shin-Etsu Silicones and Dow Corning.

The amount of polymer (A) to be used in this invention ranges from about 15 to about 95 percent by weight of the total composition, preferably, from about 30 to about 85 percent by weight of the total composition and most preferably about 30 to about 75 percent by weight of the composition.

The trifunctional crosslinking agent (B) has the formula: R—Si(ON=CR'$_2$)$_3$ where R is phenyl. R' may be any saturated straight chain or branched alkyl radical of from about 1 to about 8 carbon atoms. Methods for the preparation of such ketoximino silanes are known in the art. See U.S. Pat. No. 4,380,660 and U.S. Pat. No. 4,400,527 to Matthew. These patents as well as U.S. Pat. No. 3,186,576 to Sweet disclose the various ketoximes which can be used in this invention. The above patents are incorporated herein by reference. Illustrative of some of these ketoximes are methyl ethyl ketoxime, diethylketone oxime, acetone oxime, methyl isobutyl ketoxime, methyl amyl ketoxime, and cyclohexanone oxime. Because of the relative availability of methyl ethyl ketoxime and methyl isobutylketoxime, the preferred silane crosslinking agents (B) in this invention are phenyl tris-(methyl ethyl ketoximino) silane or phenyl tris-(methyl isobutylketoximino) silane. Phenyl tris-(methyl ethyl ketoximino) silane is commercially available from Honeywell International Inc. of Morristown, N.J. Crosslinker (B) is generally present in an amount of from about 1 to about 10 percent by weight of the total composition, and preferably from about 2 to about 7 percent by weight of the total composition, and most preferably from about 3 to about 6 percent by weight of the total composition.

Although it is preferred that crosslinker (B) is the sole crosslinker used in this invention, in another embodiment of the invention mixtures of phenyl substituted tris functional silanes are employed. In still another embodiment, at least one phenyl substituted tris functional silane is used with small amounts of other crosslinkers. These other crosslinkers are well known in the art and include methyltrimethoxysilane, vinyl trimethoxysilane, methyltriethoxysilane, vinyltriethoxysilane, methyltriacetoxysilane, ethyltriacetoxysilane, methyl tris-(N-methylbenzamido) silane, methyl tris(isopropenoxy) silane, and methyl tris-(cyclohexylamino) silane, methyl tris(methyl ethyl ketoxirino) silane, vinyl tris-(methyl ethyl ketoximino) silane, methyl tris-(methyl isobutyl ketoximino) silane, vinyl tris-(methyl isobutyl ketoximino) silane, tetrakis-(methyl ethyl ketoxirino) silane, tetrakis (methyl isobutyl ketoximino) silane, and tetrakis-(methyl amyl ketoximino) silane. Difunctional ketoximino silanes may also be used such as dimethyl di(methyl ethyl ketoximino) silane, methyl vinyl di-(methyl ethyl ketoximino) silane, methyl vinyl di-(methyl isobutyl ketoximino) silane, and methyl vinyl di-(methyl amyl ketoximino) silane.

Tetrafunctional alkoxy-ketoxime silanes as disclosed by Klosowski U.S. Pat. No. 15 4,657,967 and Haugsby U.S. Pat. No. 4,973,623 can also be used to modulate cure speed of the present invention. Similarly other tetrafunctional alkoxy-ketoximino silanes as described in U.S. patent application Ser. Nos. 947,015 filed Sep. 17, 1992; 143,777 filed Nov. 1, 1993 and 158,660 filed Nov. 29,1993 can be used. All of the above crosslinkers may be added as mixtures with crosslinker (B) or added separately to the composition of this invention. It is preferable that any auxiliary crosslinkers used not exceed about 25 percent by weight of the total crosslinker level. Using crosslinkers other than (B) in increasing amounts, in conjunction with (B) generally increases the modulus and decreases the elongation of the cured composition of the invention and decreases the adhesion of the sealant or coating to acrylic substrates. Crosslinker (B) as well as other crosslinkers used can be added to (A) before the addition of other ingredients under.anhydrous conditions.

The composition of the present invention contains an adhesion promoter (C) which is characterized as having an amino functional group and less than three hydrolyzable alkoxy groups attached to silicon or Si. N-(2-aminoethyl)3-aminopropylmethyldimethoxy silane, gamma-aminopropylmethyldiethoxysilane, gamma-aminopropylmethyldimethoxysilane, N-(2-aminoethyl)-3aminopropylmethyldiethoxy and mixtures thereof are examples of aminofunctional silanes with two hydrolyzable alkoxy groups which provide adhesion to acrylic. These promoters are generally used in an amount of from about 0.1 to about 3 percent by weight of the total composition. Preferably from about 0.2 to about 2.5 percent by weight of the total composition and most preferably from about 0.5 to about 1.5 percent by weight of the total composition. N-(2-aminoethyl)3-aminopropylmethyldimethoxy silane is available from Witco, Huls/Degussa, and Shin-Etsu while gamma-aminopropylmethyldiethoxysilane is available from Huls and gamma-aminopropylmethyldimethoxysilane is available from Silar Industries. Although it is contemplated that N-(2-aminoethyl)-3aminopropylmethyldiethoxy provides good adhesion, there is no commercial source for this material today. However, it can be prepared by adapting the method disclosed in Japanese application, JP 92-7593, to Shinetsu Chemical Ind. for the production of N-(aminoethyl)-3-aminopropylmethyldimethoxysilane Essentially,, one would react 1 equivalent of 3-chloropropylmethyldiethoxysilane is reacted with 3–5 equivalents of ethylenediamine. This material may also be prepared by using methyldichlorosilane hydrosilylation with 3-chloropropene, then reacting the product with ethanol and ethylenediamine per the publication by Jiangxi Normal University Department of Chemistry (Peng, Yiyuan; Mao, Xuechan et al.) 1998.

While the basic embodiment of the invention utilizes one adhesion promoter of the invention in the composition, in another embodiment, mixtures of adhesion promotors of the invention (i.e., containing an amino functional group and less than three hydrolyzable alkoxy groups attached to silicon) can be used to obtain optimal adhesion to acrylic. In still another embodiment of the invention, at least one adhesion promoter of the invention is used with still other adhesion promoters to obtain an improvement in various other properties of the composition such as improved resistance to hydrolysis or improved adhesion to other surfaces. Typically these adhesion promoters can be chosen from many organofunctional silanes known in the art. A nonexhaustive list of such silanes include gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, bis-(gammatrimethoxysilylpropyl)amine, gamma-ureidopropyltrimethoxysilane, 3-glycidoxypropyltrimethoxy silane, beta-(3,4-epoxycyclohexyl) ethyltrimethoxysilane, tris-[3-(trimethoxysilyl)propyl] isocyanurate, gammaglycidoxypropylmethyldiethoxysilane, N-phenyl-gamma-aminopropyltrimethoxy silane, gamma-mercaptopropyltrimethoxysilane, and gamma-methacryloxypropyltrimethoxysilane.

Preferably the optional adhesion promotors are present in an amount of from about 0.2 to about 1.0 percent by weight of the total composition. However as the presence or level of the optional adhesion promoters,increases, the adhesion to acrylic is usually decreased. Thus only a minimum level of the optional adhesion promoters is desired to achieve the overall balance of desired properties. These adhesion promoters can be obtained from a number of sources such as Huls/Degussa, Witco, Shin-Etsu and Dow Corning Corp.

The compositions of the present invention may contain various other optional ingredients including a filler. The filler can be a reinforcing filler or non-reinforcing filler or mixtures thereof Examples of reinforced fillers are silica fillers, such as, fumed silica and precipitated silica. The fumed silica can be used as is or treated to provide a hydrophobic surface. Examples of treated fillers are those surface treated with various siloxanes, silazanes, and chlorosilanes. Examples of treating agents include but are not limited to polydimethylsiloxane, octamethylcyclotetrasiloxane, dimethyldichlorosilane, or hexamethyldisilazane. Although the amount and type of filler will vary with the desired properties for the end composition, preferably, fumed silicas are used which have surface areas ranging from about 90 to 300 about M2/gram. More preferably fumed silicas with surface areas of from about 130 to about 200 m2/gram are used. The amount of reinforcing filler used ranges from about 0 to about 25 percent by weight of the total composition; and preferably from about 2 to about 12 percent by weight of the total composition and most preferably from about 2 to about 8 percent by weight of the total composition. Use of reinforcing fumed silicas impart increased tensile strength to the cured composition as well as providing thixotropic character to the uncured composition. These silicas are readily available from Cabot Corp, Degussa Corp, Wacker Silicones and others. A nonreinforcing or semi-reinforcing filler can also be used, including thermal and electrically conductive fillers. Examples of such fillers are fillers with surface areas of from.about 2 to about 90 m2/gm such as ground or precipitated calcium carbonate (treated and untreated), and ground quartz etc. The amount of non or semi-reinforcing filler used generally ranges from about 0 to about 60 percent by weight of the total composition, preferably from about 5 to about 50 percent by weight and most preferably from about 10 to about 40 percent by weight of the total composition. Other semi-reinforcing fillers or extending fillers which are known in the art may be used to influence other properties of the sealant. These fillers include but are not limited to silica aerogel, diatomaceous earth, iron oxide, titanium oxide, aluminum oxide, zirconium silicate, calcined clay, magnesium oxide, talc, wollastonite, hydrated alumina, dolamite, ferrous aluminum silicate, and carbon black.

The total of all fillers should be in the range of from about 0 to about 60 percent by weight of the total composition in this invention, although thermal and electrically conductive fillers can be present from about 1 to about 75 percent by weight of the total composition. The filler may be used alone or.in the form of a mixture of two or more. The reinforcing filler as well as other fillers are preferably added after the crosslinker and polymer have been mixed. The filler(s) is added under anhydrous conditions to avoid undesired exposure to moisture.

The novel one component RTV silicone compositions of this invention can also comprise a catalyst to accelerate the reaction of (A) with (B). Various catalysts may be used, for example, organotin carboxylates such as dibutyltin dilaurate, dibutyltin diacetate, dibutyltin dioctoate, dibutyltin maleate, dialkyl tin hexoates, and dioctyltin dilaurate etc. Other catalysts as well may be utilized such as iron octanoate, zinc octanoate, lead octanoate, cobalt naphthenate etc. Titanium compounds may also be used such as tetrapropyltitanate and tetrabutyltitanate, di-isopropoxy titanium-bis (ethylacetoacetate), dibutoxy titanium- bis-acetylacetonate, dibutoxy titanium- bis-ethylacetylacetonate and tetratertiarybutoxy titanate. Dibutyltindilaurate is the preferred catalyst. Useful levels of the catalysts can range from about 0.01 to about 2.0 percent by weight of the total composition. Preferred levels range from about 0.02 to about 1 percent by weight of the total composition and most preferred levels range from about 0.02 to about 0.2 percent by weight of the total composition. Many of the organotin carboxylates are available from Witco Corp, Elf-Atochem Corp and Cosan Chemicals. Titanates are available from Dupont, Huls, and Kenrich Petrochemicals.

Although not essential, it is preferred to incorporate plasticizer in the compositions of the invention. Plasticizers can be used to improve extrusion properties of the composition and to modify modulus of the cured composition. Well known plasticizers are triorganosilyl endblocked diorganopolysiloxanes, which can have a viscosity ranging from about 10 to about 100,000 centipoise at 25° C. The, organic groups can be any monovalent hydrocarbon radicals, however alkyl radicals of from about 1 to about 8 carbons such as methyl are preferred. Other organic plasticizers known in the art can be used as well. These are isoparaffinic hydrocarbon oils and other paraffinic and aliphatic hydrocarbon oils which do not bleed from the cured sealant. These are available from Exxon, Chevron, Total etc. Use of these oils may have some long term effects on the performance of the sealant such as lower elongation and increased stiffening of the sealant. The plasticizer is generally added in an amount of from about 0 to 100 parts by weight per about 100 parts by weight of (A). Preferred levels of plasticizer range from about 5 to about 70 parts by weight per about 100 parts by weight of (A) and most preferred levels of plasticizer range from about 10 to about 50 parts by weight to about 100 parts by weight of (A). Preferred viscosity of the diorganopolysiloxane plasticizer is from about 100 to about 1000 centipoise at 25° C. Generally, the plasticizer (if it is used in the composition) is added to the polymer (A), before the crosslinker (B) is added.

A variety additives may be employed in the compositions of the invention including a pigment, thixotropic agent, fungicide, mildewcide, water repellant, ultraviolet ray absorber, heat resistance improving agent, flame retardant, surfactant, antistatic and antisoiling agent. Suitable materials falling within each of these classes are well known in the art. These materials are generally present in an amount of from about 0.05 to about 2 percent by weight of the total composition.

The composition of the present invention can be used in the form of a one component or one package room temperature curing polysiloxane composition which is produced by mixing all of the above described components and various additives in the absence of moisture and is stored in a closed vessel (impervious to moisture). Generally the composition is made by mixing under vacuum to prevent moisture from entering the composition. Mixing takes place at room temperature, although some heat will be generated due to the friction of mixing. Mixing takes place in a mixing vessel typically used in the art for producing silicone sealants and coatings. The composition is cured to a silicone elastomer with exposure to atmospheric moisture at the time of use when, the package is broken. Care must be taken to adjust crosslinker levels to the total level of moisture in the composition in order to ensure a stable one component package. Generally an excess of crosslinker (B) used alone or with other triketoximino functional silanes will protect the composition from the deleterious effects of moisture accidentally entering.

The compositions of this invention solve continuing industry needs with respect to generating adhesion to difficult plastics. The composition provides low odor and adhesion to a variety of substrates, especially hard to stick to surfaces such as acrylic. Adhesion to other surfaces such as pvc, polycarbonate, aluminum, glass, ceramics, and many masonry surfaces is also improved. The compositions of this invention can particularly serve a variety of applications such as providing coating, caulking and encapsulating materials especially where adhesion to an acrylic substrate or acrylic coated substrate is critical one such example is the attachment of components to acrylic signage, such as the attachment of acrylic shields to metal or plastic frames etc., where a bead of sealant of about 1/8' h inch wide by about 1/8th inch deep or larger is applied to an acrylic substrate and is brought in contact with the other substrate. The assembly, is fixtured if necessary and allowed to cure as necessary to achieve a satisfactory bondstrength. Generally, the compositions of the invention are cured for from about 24 to about 72 hours.

What is claimed is:

1. A room temperature vulcanizable silicone rubber composition comprising;
   (a) hydroxyl endblocked polyorganosiloxane;
   (b) at least one phenyl-substituted, tris-functional ketoximinio silane; and
   (c) an adhesion promoter consisting essentially one or more aminofunctional silanes, at least one of which is characterized by having less than three hydrolyzable alkoxy groups attached to the silicon.

2. The composition of claim 1, wherein the phenyl-substituted, tris-functional ketoximino silane is R—Si(ON=CR'$_2$)$_3$, wherein R is phenyl and R' is a saturated straight chain or branched alkyl radical of from about 1 to about 8 carbon atoms.

3. The composition of claim 1, wherein the phenyl-substituted, tris-functional ketoximino silane is present in an amount from about 1 to about 10 percent by weight of the total composition.

4. The composition of claim 1, wherein the aminoftimctional silane adhesion promoter is selected from the group consisting of. N-(2-aminoethyl)-3-aminopropylmethyldimethoxy silane, gamma- aminopropylmethyldiethoxy siklane, gamma-aminopropylmethyldimethoxy silane, N-(2-aminoethyl)-3-am-inopropylmethyidiethoxy silane and mixtures thereof.

5. The composition of claim 1, wherein the aminofunctional silane adhesion promoter is present in amount from about 0.1 to about 3 percent by weight.

6. The composition of claim 1, further comprising an additional adhesion promoter, wherein the additional adhesion promoter is not an aminofunctional silane adhesion promoter including silicon, characterized as having less than three hydrolyzable alkoxy groups attached to the silicon.

7. The composition of claim 6, wherein the additional adhesion promoter is selected from the group consisting of: gamma-aminopropyltriethoxysilane, gamma-aminopropyltrimethoxysilane, N-(2-aminoethyl)-3-aminopropyl-triethoxysilane, N-(2-aminoethyl)-3-aminopropyltrimethoxysilane, trimethoxysilylpropyldiethylene triamine, bis-(gammatrimethoxysilylpropyl)amine, gamma-ureidopropyltrimethoxysilane, 3-glycidoxypropyltrimethoxy silane, beta-(3,4-epoxycyclohexyl) ethyltrimethoxysilane, tris-[3-(trimethoxysilyl)propyl] isocyanurate, gamma-glycidoxypropylmethyldiethoxysilane, N-phenyl-gamma-aminopropyltrimethoxy silane, gamma-mercaptopropyltrimethoxysilane, and gamma-methacryloxypropyltrimethoxysilane.

8. The composition of claim 1, further comprising: a filler.

9. The composition of claim 1, further comprising: an additive.

10. The composition of claim 9, in which the additive is selected from the group consisting of: a pigment, a thixotropic agent, a fungicide, a mildewcide, a water repellant, an ultraviolet ray absorber, a heat resistance improving agent, a flame retardant, a surfactant, an antistatic agent, and an antisoiling agent.

11. The composition of claim 1, further comprising: a catalyst.

12. The composition of claim 11, wherein the catalyst is selected from the group consisting of: organotin carboxylates, iron octanoate, zinc octanoate, lead octanoate, cobalt naphthenate and titanium compounds.

13. The composition of claim 12, wherein the organotin carboxylate is selected from the group consisting of: dibutyltin dilaurate, dibutyltin diacetate, dibutyltin dioctoate, dibutyltin maleate, dialkyl tin hexoates, and dioctyltin dilaurate.

14. The composition of claim 12, wherein the titanium compounds are selected from the group consisting of: tetrapropyltitanate, tetrabutyltitanate, di-isopropoxy titanium-bis (ethylacetoacetate), dibutoxy titanium-bis-acetylacetonate, dibutoxy titanium-bis-ethylacetylacetonate and tetratertiarybutoxy titanate.

15. The composition of claim 1, further comprising: a plasticizer.

* * * * *